US012027954B2

(12) United States Patent
Sambuichi et al.

(10) Patent No.: US 12,027,954 B2
(45) Date of Patent: Jul. 2, 2024

(54) HOLLOW SHAFT AND METHOD FOR MANUFACTURING HOLLOW SHAFT

(71) Applicant: NIDEC CORPORATION, Kyoto (JP)

(72) Inventors: Hiroshi Sambuichi, Kyoto (JP); Desen Pan, Liaoning (CN); Wenxian Shi, Liaoning (CN)

(73) Assignee: NIDEC CORPORATION, Kyoto (JP)

( * ) Notice: Subject to any disclaimer, the term of this patent is extended or adjusted under 35 U.S.C. 154(b) by 276 days.

(21) Appl. No.: 17/706,609

(22) Filed: Mar. 29, 2022

(65) Prior Publication Data

US 2022/0320954 A1 Oct. 6, 2022

(30) Foreign Application Priority Data

Mar. 31, 2021 (CN) .......................... 202110345709.5

(51) Int. Cl.
*H02K 7/00* (2006.01)
(52) U.S. Cl.
CPC .................... *H02K 7/003* (2013.01)
(58) Field of Classification Search
CPC ...................................... H02K 7/003
USPC ...................................... 310/75 D
See application file for complete search history.

(56) References Cited

U.S. PATENT DOCUMENTS

| 10,181,764 B2 | 1/2019 | Kim et al. | |
| 11,750,048 B2* | 9/2023 | Kim | H02K 5/04 |
| | | | 310/152 |
| 11,791,685 B2* | 10/2023 | Kim | H02K 7/083 |
| | | | 310/71 |
| 11,791,688 B2* | 10/2023 | Kim | H02K 5/1737 |
| | | | 310/90 |
| 2021/0159755 A1* | 5/2021 | Boden | H02K 7/003 |
| 2022/0311296 A1* | 9/2022 | Altherr | H02K 1/32 |

FOREIGN PATENT DOCUMENTS

| CN | 210744852 | | 6/2020 | |
| DE | 2819277 | * | 12/2014 | ............ H02K 7/116 |
| JP | 2012070584 | * | 4/2012 | ............... H02K 1/27 |
| WO | 2018047601 | | 3/2018 | |

OTHER PUBLICATIONS

Machine translation of JP2012070584 Tanaka (Year: 2012).*

* cited by examiner

*Primary Examiner* — Terrance L Kenerly
(74) *Attorney, Agent, or Firm* — JCIPRNET

(57) ABSTRACT

The disclosure provides a hollow shaft and a method for manufacturing the same. The hollow shaft includes: an outer periphery component having a cylindrical shape, and the outer edge of the outer periphery component has a polygonal shape; an inner periphery component having a cylindrical shape and is fitted to the inner wall of the outer periphery component; and a bottom component including a bottom plate and a cylindrical body, the extending direction of the bottom plate is perpendicular to the axial direction, the cylindrical body extends from the radially outer circumference of the bottom plate along the axial direction toward the outer periphery component, and the inner wall of the cylindrical body fits the outer wall of the inner periphery component. The outer periphery component, the inner periphery component, and the bottom component are separately defined components. The hollow shaft of the disclosure includes three separate components defined separately.

11 Claims, 4 Drawing Sheets

601 — The outer periphery component 1, the inner periphery component 2 and the bottom component 3 are manufactured and defined in a separate manner 602 — The inner periphery component 2 is assembled to the inner wall of the outer periphery component 1, and the cylindrical body of the bottom component 3 is assembled to the outer wall of the inner periphery component 2

HOLLOW SHAFT AND METHOD FOR MANUFACTURING HOLLOW SHAFT

CROSS REFERENCE TO RELATED APPLICATIONS

The present invention claims priority under 35 U.S.C. § 119 to Chinese Application No. 202110345709.5 filed on Mar. 31, 2021 the entire content of which is incorporated herein by reference.

FIELD OF THE INVENTION

The present disclosure relates to the field of electromechanical technology, and in particular, to a hollow shaft and a method for manufacturing the hollow shaft.

BACKGROUND

A hollow shaft is sometimes adopted in a motor, and the outer circumference of the hollow shaft has a polygonal or substantially polygonal shape for arranging magnets.

Typically, the hollow shaft is integrally defined, and the outer and inner peripheries of the hollow shaft are processed through cutting to define a desired shape.

It should be noted that the above description of the technical background is only for the convenience of clearly and completely describing the technical solutions of the present disclosure, and for facilitating the understanding of those skilled in the art. It should not be assumed that the above-mentioned technical solutions are commonly known to those skilled in the art simply because these solutions are described in the background section of the present disclosure.

The inventors of the present disclosure found that, in the conventional technology, cutting the inner and outer peripheries of the integrally defined hollow shaft takes a lot of time, especially when the outer circumference of the hollow shaft is a plurality of planes arranged along the circumferential direction, each plane needs to be defined by cutting, which takes a lot of time.

SUMMARY

According to an aspect of the embodiments of the present disclosure, there is provided a hollow shaft, the hollow shaft includes the following:

An outer periphery component, which has a cylindrical or substantially cylindrical shape, and the outer edge of the outer periphery component has a polygonal or substantially polygonal shape;

An inner periphery component, which has a cylindrical or substantially cylindrical shape and is fitted to the inner wall of the outer periphery component; and A bottom component, which includes a bottom plate and a cylindrical body, the extending direction of the bottom plate is perpendicular to the axial direction, the cylindrical body extends from the radially outer circumference of the bottom plate along the axial direction toward the outer periphery component, and the inner wall of the cylindrical body fits the outer wall of the inner periphery component, The outer periphery component, the inner periphery component and the bottom component are separately defined components.

According to another aspect of the embodiments of the present disclosure, the outer periphery component is a laminated press-defined polygonal steel plate.

According to another aspect of the embodiment of the present disclosure, the axial end component of the cylindrical body of the bottom component has a positioning surface.

The positioning surface supports at least one of the inner periphery component and the outer periphery component in the axial direction.

According to another aspect of the embodiments of the present disclosure, an outer periphery surface of the inner periphery component has a stepped component, and the stepped component abuts against the positioning surface in the axial direction.

According to another aspect of the embodiments of the present disclosure, a radially outer circumference of the cylindrical body is more radially inward than a radially outer circumference of the outer periphery component.

According to another aspect of the embodiments of the present disclosure, the radially outer circumference of the cylindrical body is more radially outward than the radially outer circumference of the outer periphery component.

The positioning surface further supports a magnet provided on the outer circumference of the outer periphery component.

According to another aspect of the embodiments of the present disclosure, a radially outer circumference of the cylindrical body is more radially inward than a radially outer circumference of the magnet.

According to another aspect of the embodiments of the present disclosure, a gap is defined in the axial direction between a radially outer circumference of the inner periphery component that is axially close to one end of the bottom plate and the bottom plate.

According to another aspect of the embodiments of the present disclosure, a radially inner circumference of the inner periphery component that is axially close to one end of the bottom plate and the bottom plate are welded through solder.

According to another aspect of the embodiments of the present disclosure, there is provided a method of manufacturing the hollow shaft according to any aspect of the above embodiments, and the method includes the following:

The outer periphery component, the inner periphery component and the bottom component are manufactured and defined in a separate manner;

The bottom component and the outer wall of the inner periphery component are assembled together; and The inner periphery component is assembled to the inner wall of the outer periphery component.

The above and other elements, features, steps, characteristics and advantages of the present disclosure will become more apparent from the following detailed description of the preferred embodiments with reference to the attached drawings.

Features described and/or illustrated for one embodiment may be used in the same or similar manner in one or more other embodiments, combined with features in other embodiments, or replace features in other embodiments.

BRIEF DESCRIPTION OF THE DRAWINGS

The accompanying drawings, which are included to facilitate further understanding of the embodiments of the disclosure, constitute a part of the specification, are used to illustrate embodiments of the disclosure, and together with the written description, serve to explain the principles of the disclosure. Clearly, the drawings in the following description only illustrate some embodiments of the present disclosure, and for those of ordinary skill in the art, other drawings can also be obtained from these drawings without inventive effort. In the attached image.

DESCRIPTION OF THE EMBODIMENTS

Figure 1:
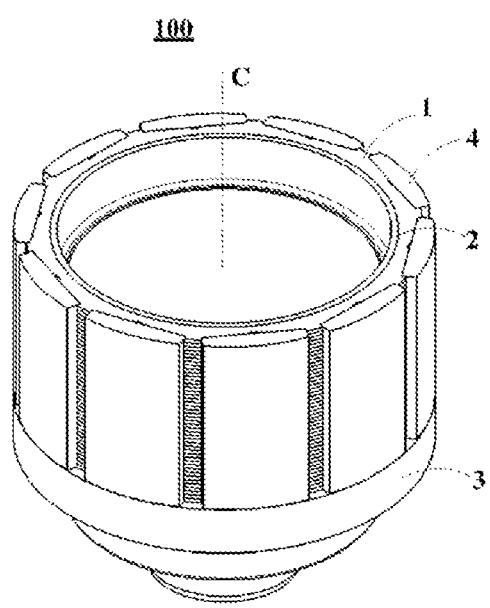
FIG. 1 is a three-dimensional schematic view of a hollow shaft of the first exemplary embodiment of the present disclosure.

The foregoing and other features of the present disclosure will become clear from the following description with reference to the accompanying drawings. In the specification and drawings, exemplary embodiments of the disclosure are disclosed in detail, showing some embodiments in which the principles of the disclosure may be employed. It may be understood that the disclosure is not limited to the described embodiments, but rather the disclosure includes all modifications, variations and equivalents falling within the scope of the appended claims.

In addition, in each of the drawings used in the following description, since each structural component has a size that is able to be recognized on the drawing, the scale is different for each structural component, and the present disclosure is not limited to the number of structural components, the shape of the structural components, the ratio of the size of the structural components, and the relative positional relationship of the structural components.

In the embodiments of the present disclosure, the terms "first", "second", etc. are used to distinguish different components, but do not indicate the spatial arrangement or temporal order of these components, and these components should not be limited by the terminologies. The term "and/or" includes any and all combinations of one or more of the associated listed items. The terms "comprising", "including", "having", etc. refer to the presence of described features, components, elements or assemblies, but do not exclude the presence or addition of one or more other features, components, elements or assemblies.

In the embodiments of the present disclosure, the singular forms "a", "the", etc. include plural forms, and should be broadly understood as "one kind of" or "one type of" rather than being limited to the meaning of "one". In addition, the term "the" is understood to include both the singular and the plural meanings, unless the context clearly dictates otherwise. Furthermore, the term "according to" should be understood as "at least in part according to . . . " and the term "based on" should be understood as "based at least in part on . . . " unless the context clearly dictates otherwise.

In the embodiments of the present disclosure, a direction that extends along the central axis of the hollow shaft or parallel to its direction is referred to as "axial direction", a radial direction using the central axis as the center is referred to as "radial direction", and a direction surrounding the central axis is referred to as "circumferential direction". Along the "axial direction", the direction from the bottom to the inner periphery component is referred to as the "upper" direction, and the direction opposite to the "upper" direction is referred to as the "lower" direction. It should be noted that the definitions of each direction in this specification are only for ease of describing the embodiments of the present invention, and do not limit the direction of the hollow shaft and the like during use and manufacture.

The first exemplary embodiment of the present disclosure provides a hollow shaft.

Figure 2:
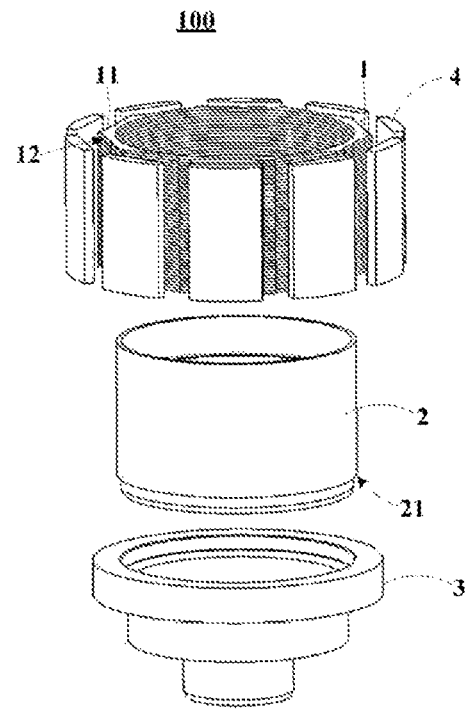
FIG. 2 is an exploded schematic view of the hollow shaft.
Figure 3:
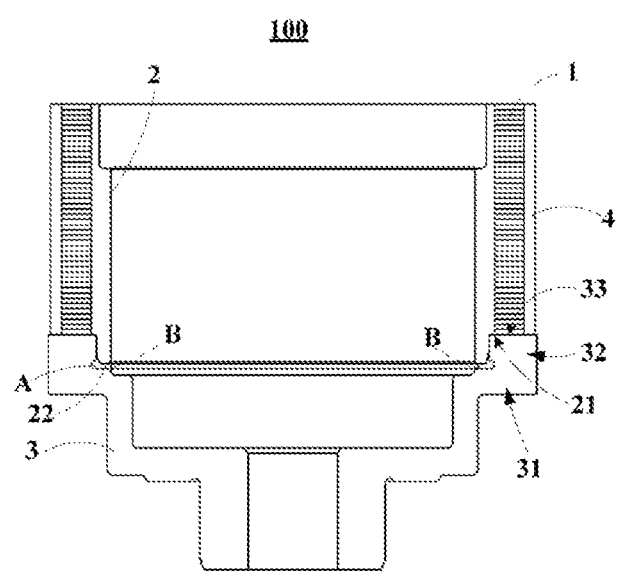
FIG. 3 is a schematic cross-sectional view of one shaft of the hollow shaft.

FIG. 1 is a three-dimensional schematic view of a hollow shaft of the first exemplary embodiment of the present disclosure. FIG. 2 is an exploded schematic view of the hollow shaft. FIG. 3 is a schematic cross-sectional view of one shaft of the hollow shaft.

As shown in FIG. 1 to FIG. 3, the hollow shaft 100 includes an outer periphery component 1, an inner periphery component 2 and a bottom component 3. As shown in FIG. 1, the hollow shaft 100 has a central axis C.

In this embodiment, the outer periphery component 1, the inner periphery component 2 and the bottom component 3 are separately molded components.

The outer periphery component 1 has a cylindrical or substantially cylindrical shape, and the outer edge 11 of the outer periphery component 1 (shown in FIG. 2) has a polygonal or substantially polygonal shape. For example, the outer periphery surface of the outer periphery component 1 may include a plurality of planes 12 distributed continuously along the circumferential direction (shown in FIG. 2).

The inner periphery component 2 has a cylindrical or substantially cylindrical shape and is fitted to the inner wall of the outer periphery component 1. For example, the inner periphery component 2 is provided by being fitted to the inner wall of the outer periphery component 1 by means of an interference fit.

As shown in FIG. 3, the bottom component 3 may include a bottom plate 31 and a cylindrical body 32. The extending direction of the bottom plate 31 is perpendicular to the axial direction. The cylindrical body 32 extends from the radially outer circumference of the bottom plate 31 along the axial direction toward the outer periphery component 1, and the inner wall of the cylindrical body 32 fits the outer wall of the inner periphery component 2. For example, the inner wall of the cylindrical body 32 and the outer wall of the inner periphery component 2 are assembled together by means of an interference fit.

According to the first exemplary embodiment of the present disclosure, the hollow shaft includes three separate components defined separately. Compared with the processing of the integrally defined hollow shaft, the processing of three independent components is simpler, and therefore, the time spent for processing the hollow shaft is able to be reduced.

In the present embodiment, the outer periphery component 1 is a laminated press-defined polygonal steel plate. Therefore, the outer circumference of the outer periphery component 1 is able to be defined into a plurality of planes 12 continuously distributed in the circumferential direction without cutting the outer circumference of the outer periphery component 1. In this manner, the time for manufacturing the hollow shaft 100 are significantly reduced.

In this embodiment, as shown in FIG. 1, FIG. 2 and FIG. 3, the axial end component of the cylindrical body 32 of the bottom component 3 has a positioning surface 33 that may support the inner periphery component 2 in the axial direction. For example, as shown in FIG. 2 and FIG. 3, the outer periphery surface of the inner periphery component 2 has a stepped component 21 that may abut against the positioning surface 33 in the axial direction so that the positioning surface 33 supports the inner periphery component 2 in the axial direction.

Moreover, the present embodiment may not be limited thereto. As shown in FIG. 3, the positioning surface 33 may further support the outer periphery component 1 in the axial direction, so that the positioning surface 33 may support both the outer periphery component 1 and the inner periphery component 2 in the axial direction. Alternatively, the outer periphery surface of the inner periphery component 2 may not have the stepped component 21, so that the outer periphery surface of the inner periphery component 2 does not abut against the positioning surface 33 in the axial direction. As such, the positioning surface 33 supports the outer periphery component 1 in the axial direction but not support the inner periphery component 2.

By providing the positioning surfaces 33, the axial positioning of the inner periphery component 2 and/or the outer periphery component 1 is facilitated during assembly of the outer periphery component 1, the inner periphery component 2, and the bottom component 3, thereby simplifying dimension management and the positioning accuracy is able to be improved.

In the present embodiment, the radially outer circumference of the cylindrical body 32 is able to be more radially inward than the radially outer circumference of the outer periphery component 1. In this manner, the radial dimension of the cylindrical body 32 is able to be controlled and the dimension management of the cylindrical body 32 is facilitated.

As shown in FIG. 3, a magnet 4 is provided on the outer circumference of outer periphery component 1, and the number of magnet 4 may be plural. Each magnet 4 is able to be arranged on each plane 12 of the outer circumference of outer periphery component 1 (as shown in FIG. 2).

As shown in FIG. 3, the radially outer circumference of the cylindrical body 32 of the bottom component 3 is more radially outward than the radially outer circumference of the outer periphery component 1, and the positioning surface 33 further supports the axial end component of the magnet 4, thereby facilitating axial positioning of the magnet 4.

In this embodiment, the radially outer circumference of the cylindrical body 32 is more radially inward than or radially aligned with the radially outer circumference of the magnet 4, so that the radial dimension of the cylindrical body 32 is able to be controlled, and the dimension management of the cylindrical body 32 is able to be facilitated.

In the present embodiment, as shown in FIG. 3, a gap A is defined in the axial direction between a radially outer circumference of the inner periphery component 2 that is axially close to one end 22 (i.e., the lower end of the inner periphery component 2) of the bottom plate 31 and the bottom plate 31. In this manner, the one end 22 in the axial direction of the inner periphery component 2 is prevented from contacting the bottom plate 31, and it is able to be ensured that the stepped component 21 of the inner periphery component 2 abuts against the positioning surface 33 in the axial direction, thereby realizing the axial positioning of the inner periphery component 2.

In this embodiment, as shown in FIG. 3, the radially inner circumference of one end 22 of the inner periphery component 2 and the bottom plate 31 is able to be welded together through a solder B, thereby making the connection between the inner periphery component 2 and the bottom component 3 more secure. In an embodiment, in the case where the stepped component 21 of the inner periphery component 2 abuts against the positioning surface 33 in the axial direction, the radially inner circumference of one end 22 of the inner periphery component 2 is able to be welded to the bottom plate 31 through solder. In this manner, not only that the axial positioning of the inner periphery component 2 is able to be achieved, but also the connection between the inner periphery component 2 and the bottom component 3 is able to be more secure.

According to the first exemplary embodiment of the present disclosure, the hollow shaft includes three separate components defined separately. Compared with the processing of the integrally defined hollow shaft, the processing of three independent components is simpler, and therefore, the time spent for processing the hollow shaft is reduced, the manufacturing cost is reduced, and the production efficiency of the hollow shaft is improved.

This embodiment provides a motor, which may include the hollow shaft 100 described in the first exemplary embodiment. Since the structure of the hollow shaft 100 has been described in the first exemplary embodiment, the related description is incorporated herein and not further repeated.

Figure 4:
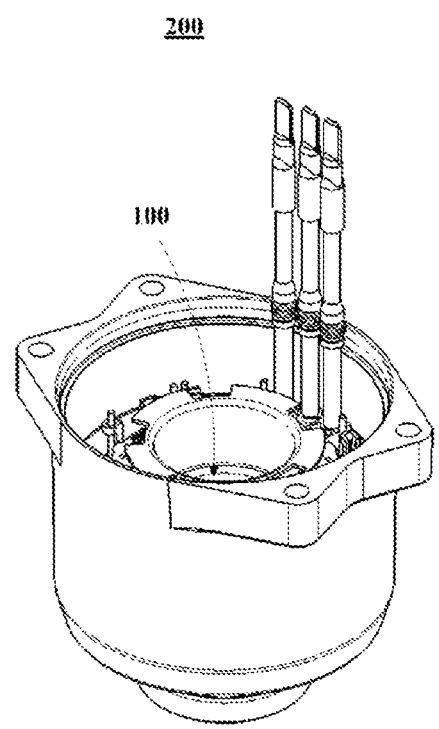
FIG. 4 is a three-dimensional schematic view of the motor of the second exemplary embodiment.
Figures 5, 6:
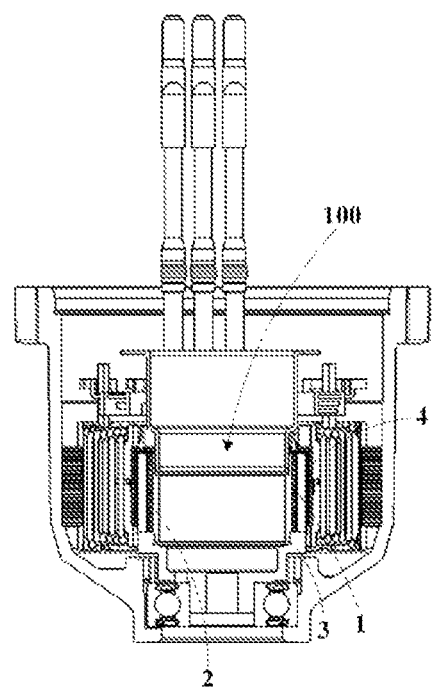
FIG. 5 is a schematic cross-sectional view of a shaft of the motor of the second exemplary embodiment.
FIG. 6 is a flowchart of a method for manufacturing a hollow shaft according to the third exemplary embodiment of the present disclosure.

FIG. 4 is a three-dimensional schematic view of the motor of the second exemplary embodiment. FIG. 5 is a schematic cross-sectional view of a shaft of the motor of the second exemplary embodiment.

As shown in FIG. 4 and FIG. 5, the motor 200 includes the hollow shaft 100. Furthermore, as shown in FIG. 5, the hollow shaft 100 includes an outer periphery component 1, an inner periphery component 2 and a bottom component 3. The motor 200 further includes a magnet 4 provided on the outer circumference of the outer periphery component 1. Moreover, other components of the motor 200 shown in FIG. 5 is able to be derived from related technology.

Since the motor of this embodiment adopts the structure of the hollow shaft described in the first exemplary embodiment, the cost of manufacturing the hollow shaft is able to be reduced, the production efficiency of the hollow shaft is able to be improved, and the production efficiency of the motor is able to be further improved.

In this embodiment, the motor is able to be applied to electrical products such as indoor units as air conditioners, outdoor units of air conditioners, water dispensers, washing machines, sweepers, compressors, blowers, mixers and other household appliances, or, is able to be an in-vehicle product using a motor, such as an automotive electronic vacuum pump, an automotive brake, an automotive transmission, etc.; or, the product is able to be a variety of information devices and industrial devices using a motor.

This embodiment provides a method for manufacturing a hollow shaft, which is able to be used to manufacture the hollow shaft 100 described in the first exemplary embodiment. The structure of the hollow shaft 100 is able to be derived from the first exemplary embodiment; the related description is incorporated herein and is not further repeated here.

FIG. 6 is a flowchart of a method for manufacturing a hollow shaft according to the third exemplary embodiment of the present disclosure. In at least one embodiment, as shown in FIG. 6, the method of manufacturing the hollow shaft may include the following procedures:

Procedure 601: The outer periphery component 1, the inner periphery component 2 and the bottom component 3 are manufactured and defined in a separate manner.

Procedure 602: The inner periphery component 2 is assembled to the inner wall of the outer periphery component 1, and the cylindrical body of the bottom component 3 is assembled to the outer wall of the inner periphery component 2.

In procedure 602, the bottom component 3 and the outer wall of the inner periphery component 2 is able to be assembled together first, and then the inner periphery component 2 is assembled to the inner wall of the outer periphery component 1.

It should be noted that the above method may also include other procedures of manufacturing the hollow shaft 100, the description of other procedures is able to be derived from related technology and is omitted here.

According to the manufacturing method of the hollow shaft in the present embodiment, the outer periphery component 1, the inner periphery component 2 and the bottom component 3 are manufactured and defined in a separate manner, and then the three independent components separately defined are assembled together. Compared with the processing of integrally defined hollow shaft, the processing of three independent components is simpler, therefore, the time spent for processing the hollow shaft is able to be reduced, the manufacturing cost is able to be reduced, and the production efficiency of manufacturing the hollow shaft is able to be improved.

The present disclosure has been described above with reference to the exemplary embodiments, but those skilled in the art should understand that these descriptions are all exemplary and do not limit the scope to be protected by the present disclosure. Various variations and modifications of the present disclosure is able to be made by those skilled in the art in accordance with the spirit and principles of the present disclosure, and these variations and modifications also fall within the scope of the present disclosure.

Features of the above-described preferred embodiments and the modifications thereof is able to be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A hollow shaft, comprising:
    an outer periphery component, which has a cylindrical shape, wherein an outer edge of the outer periphery component has a polygonal shape;
    an inner periphery component, which has a cylindrical shape and is fitted to an inner wall of the outer periphery component; and
    a bottom component, which comprises a bottom plate and a cylindrical body, wherein an extending direction of the bottom plate is perpendicular to an axial direction, the cylindrical body extends from a radially outer circumference of the bottom plate along the axial direction toward the outer periphery component, and an inner wall of the cylindrical body fits an outer wall of the inner periphery component,
    wherein the outer periphery component, the inner periphery component and the bottom component are separately defined components,
    an axial end component of the cylindrical body of the bottom component has a positioning surface,
    the positioning surface supports at least one of the inner periphery component and the outer periphery component in the axial direction,
    a radially outer circumference of the cylindrical body is more radially outward than a radially outer circumference of the outer periphery component,
    the positioning surface further supports a magnet provided on an outer circumference of the outer periphery component.

2. The hollow shaft according to claim 1, wherein,
    the outer periphery component is a laminated press-defined polygonal steel plate.

3. The hollow shaft according to claim 1, wherein,
    an outer periphery surface of the inner periphery component has a stepped component, and the stepped component abuts against the positioning surface in the axial direction.

4. The hollow shaft according to claim 1, wherein,
    the radially outer circumference of the cylindrical body is more radially inward than a radially outer circumference of the magnet.

5. A method for manufacturing the hollow shaft according to claim 4, comprising:
    manufacturing and defining the outer periphery component, the inner periphery component and the bottom component in a separate manner;
    assembling the bottom component and the outer wall of the inner periphery component together; and
    assembling the inner periphery component to the inner wall of the outer periphery component.

6. The hollow shaft according to claim 1, wherein
    a gap is defined in the axial direction between a radially outer circumference of the inner periphery component that is axially close to one end of the bottom plate and the bottom plate.

7. The hollow shaft according to claim 6, wherein,
    a radially inner circumference of the inner periphery component that is axially close to the one end of the bottom plate and the bottom plate are welded through a solder.

8. A method for manufacturing the hollow shaft according to claim 7, comprising:
    manufacturing and defining the outer periphery component, the inner periphery component and the bottom component in a separate manner;
    assembling the bottom component and the outer wall of the inner periphery component together; and
    assembling the inner periphery component to the inner wall of the outer periphery component.

9. A method for manufacturing the hollow shaft according to claim 1, comprising:
    manufacturing and defining the outer periphery component, the inner periphery component and the bottom component in a separate manner;
    assembling the bottom component and the outer wall of the inner periphery component together; and
    assembling the inner periphery component to the inner wall of the outer periphery component.

10. A motor, comprising the hollow shaft claimed in claim 1, wherein the hollow shaft comprises the outer periphery component, the inner periphery component and the bottom component, the motor further comprises a magnet provided on an outer circumference of the outer periphery component.

11. An electrical product, comprising the motor claimed in claim 10.

* * * * *